United States Patent
Lamb (10) Patent No.: US 9,311,751 B2
(45) Date of Patent: Apr. 12, 2016

(54) DISPLAY OF SHADOWS VIA SEE-THROUGH DISPLAY

(75) Inventor: Mathew Lamb, Mercer Island, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 169 days.

(21) Appl. No.: 13/323,403

(22) Filed: Dec. 12, 2011

(65) Prior Publication Data

US 2013/0147826 A1 Jun. 13, 2013

(51) Int. Cl.
*G06T 15/60* (2006.01)
*G06T 19/00* (2011.01)
*G09G 3/00* (2006.01)
*G06F 3/01* (2006.01)
*G02B 27/01* (2006.01)

(52) U.S. Cl.
CPC ............ *G06T 19/006* (2013.01); *G02B 27/017* (2013.01); *G06F 3/011* (2013.01); *G06T 15/60* (2013.01); *G09G 3/003* (2013.01); *G02B 2027/014* (2013.01); *G02B 2027/0118* (2013.01); *G02B 2027/0138* (2013.01); *G09G 2320/02* (2013.01); *G09G 2320/0242* (2013.01); *G09G 2340/12* (2013.01)

(58) Field of Classification Search
CPC ....... G06T 19/006; G06T 15/60; G06T 15/50; G06T 19/00; G01C 21/365
See application file for complete search history.

(56) References Cited

U.S. PATENT DOCUMENTS

| 5,742,749 | A | 4/1998 | Foran et al. |
| 6,301,442 | B1* | 10/2001 | Uchida et al. ................. 396/166 |
| 6,307,526 | B1 | 10/2001 | Mann |
| 6,614,408 | B1 | 9/2003 | Mann |
| 6,933,948 | B2 | 8/2005 | Gonsalves |
| 7,301,547 | B2 | 11/2007 | Martins et al. |
| 7,508,455 | B2 | 3/2009 | Liu et al. |
| 7,623,137 | B1* | 11/2009 | Miller ........................... 345/592 |

(Continued)

FOREIGN PATENT DOCUMENTS

| CN | 101002253 A | 7/2007 | |
| DE | 10 2009 037 865 A1 * | 2/2011 | ................ G06F 3/00 |

OTHER PUBLICATIONS

Chuang, Yung-Yu, et al. "Shadow matting and compositing." ACM Transactions on Graphics (TOG). vol. 22. No. 3. ACM, 2003.*

(Continued)

*Primary Examiner* — Daniel Hajnik
(74) *Attorney, Agent, or Firm* — Dan Choi; Judy Yee; Micky Minhas (57) ABSTRACT

Various embodiments are disclosed that relate to the presentation of images of shadows cast over a real-world background by images of objects displayed on a see-through display. For example, one disclosed embodiment provides a method of operating a display device having a see-through display screen. The method comprises displaying on the see-through display screen an image of an object, and while displaying the image of the object, displaying an image of a shadow cast by the object onto the background scene by acquiring an image of a background scene, determining a location of the shadow in the image of the background scene, rendering an enhanced image of the background scene by increasing a relative brightness in a region adjacent to the shadow compared to a brightness within the shadow, and displaying the enhanced image of the background scene.

19 Claims, 5 Drawing Sheets

(56) References Cited

U.S. PATENT DOCUMENTS

| | | | |
|---|---|---|---|
| 8,243,061 | B2 | 8/2012 | Matsumura et al. |
| 8,405,680 | B1 | 3/2013 | Cardoso Lopes et al. |
| 2003/0014212 | A1 | 1/2003 | Ralston et al. |
| 2005/0007460 | A1 | 1/2005 | Stavely et al. |
| 2005/0195332 | A1 | 9/2005 | Sakagawa et al. |
| 2006/0164523 | A1 | 7/2006 | Jiang et al. |
| 2007/0038944 | A1 | 2/2007 | Carignano et al. |
| 2007/0188522 | A1 | 8/2007 | Tsuyuki |
| 2007/0236485 | A1 | 10/2007 | Trepte |
| 2008/0044095 | A1* | 2/2008 | Albiez .......................... 382/237 |
| 2008/0144962 | A1* | 6/2008 | Jung et al. ..................... 382/274 |
| 2009/0128552 | A1 | 5/2009 | Fujiki et al. |
| 2009/0225001 | A1 | 9/2009 | Biocca et al. |
| 2009/0231548 | A1* | 9/2009 | Kondo et al. ................... 353/20 |
| 2010/0281436 | A1 | 11/2010 | Kipman et al. |
| 2010/0287500 | A1 | 11/2010 | Whitlow et al. |
| 2010/0295851 | A1 | 11/2010 | Diamand |
| 2011/0002508 | A1 | 1/2011 | Basso et al. |
| 2011/0213664 | A1* | 9/2011 | Osterhout et al. ......... 705/14.58 |
| 2011/0234619 | A1 | 9/2011 | Tokunaga |
| 2011/0234631 | A1 | 9/2011 | Kim et al. |
| 2012/0026079 | A1* | 2/2012 | Maciesowicz et al. ....... 345/156 |
| 2012/0092328 | A1 | 4/2012 | Flaks et al. |
| 2013/0141434 | A1* | 6/2013 | Sugden ................ G02B 27/017 345/426 |
| 2013/0147826 | A1 | 6/2013 | Lamb |
| 2013/0208014 | A1 | 8/2013 | Fleck et al. |

OTHER PUBLICATIONS

Azuma, Ronald T. "The challenge of making augmented reality work outdoors." Mixed reality: Merging real and virtual worlds (1999): 379-390.*

Kingdom, et al., "Colour vision brings clarity to shadows", Retrieved at <<http://mvr.mcgill.ca/Fred/Papers/Kingdom&Beauce&Hunter.pdf>>, Perception 2004, vol. 33, Jun. 30, 2004, pp. 907-914.

Chin, et al., "Fast Object-Precision Shadow Generation for Area Light Sources Using BSP Trees", Retrieved at <<http://citeseerx.ist.psu.edu/viewdoc/download?doi=10.1.1.117.4280&rep=rep1&type=pdf>>, 1992, pp. 10.

"International Search Report", Mailed Date: Mar. 4, 2013, Application No. PCT/US2012/069316, Filed Date: Dec. 12, 2012, pp. 09. (MS# 333603.02).

Santos, et al., "The Daylight Blocking Optical Stereo See-Through HMD", Retrieved at <<http://btf.cs.uni-bonn.de/pub/outgoing/IGD-Best-Paper-Award/2009/Articles/SR2008_g01a03.pdf>>, In: The 2008 workshop on Immersive projection technologies/Emerging display technologies, 2008, pp. 31-32.

Santos, Pedro, et al. "Display and Rendering Technologies for Virtual and Mixed Reality Design Review", 7th International Conference on Construction Applications of Virtual Reality, Oct. 2007, pp. 165-175.

Katayama, Akihiro, et al. "Shading and Shadow Casting in Image-Based Rendering Without Geometric Models", SIGGRAPH '99, Aug. 1999, 1 page.

Knecht, Martin, et al. "Reciprocal Shading for Mixed Reality", Computers & Graphics vol. 36, No. 7, Oct. 18, 2012, pp. 846-856.

Konttinen, Jaakko et al., "Real-time Illumination and Shadowing by Virtual Lights in a Mixed Reality Setting", http://graphics.cs.uctedu/MAR-Sumant11568936265.pdf, May 17, 2005, 9 pages.

Loscos, Celine et al., "Interactive Virtual Relighting of Real Scenes." IEEE Transactions on Visualization and Computer Graphics, vol. 6, No. 4, Oct. 2000, pp. 289-305.

Sato, !marl et al., "Acquiring a Radiance Distribution to Superimpose Virtual Objects onto a Real Scene". IEEE Transactions on Visualization and Computer Graphics, vol. 5, No. 1, Jan. 1999, pp. 1-12.

Sugano, Natsuki et al., "The Effects of Shadow Representation of Virtual Objects in Augmented Reality", Second IEEE and ACM International Symposium on Mixed and Augmented Reality, Oct. 7, 2003, 8 pages.

Hughes, C. et al., "Achieving Interactive-Time Realistic Illumination in Mixed Reality," Proceedings of Army Science Conference (ASC) 2004, Orlando, FL, Nov. 2004, 7 pages.

ISA European Patent Office, International Search Report & Written Opinion Issued in PCT Patent Application No. PCT/US2014/062310, Jan. 8, 2015, 11 pages.

Naemura, et al., "Virtual Shadows in Mixed Reality Environment Using Flashlight-Like Devices", In Trans. Virtual Reality Society of Japan, vol. 7, Issue 2, Jan. 2002, 11 pages.

Lutz, B. et al., "Virtual Dunhuang Art Cave: A Cave within a CAVE," Computer Graphics Forum, vol. 18, No. 3, Sep. 1999, 9 pages.

IPEA European Patent Office, Written Opinion of the International Preliminary Examining Authority Issued in Application No. PCT/US2014/062310, Oct. 5, 2015, WIPO, 6 pages.

The State Intellectual Property Office of China, First Office Action and Search Report Issued in Chinese Patent Application No. 201280061125.4, Dec. 2, 2015, China, 18 pages.

* cited by examiner

FIG. 5 though various aspects of such image presentation may make the displayed objects appear less lifelike. For example, shadows cast by real-world objects may be noticeably absent from objects displayed on the display device.
DISPLAY OF SHADOWS VIA SEE-THROUGH DISPLAY

BACKGROUND

Various technologies may allow a user to experience a mix of real and virtual worlds. For example, some display devices, such as various head-mounted display devices, may comprise see-through displays that allow the superposition of a displayed image over a real-world background. In this manner, images may be displayed such that they appear intermixed with elements in the real-world background.

SUMMARY

Various embodiments are disclosed that relate to the presentation of images of shadows cast over a real-world background by virtual objects displayed on a see-through display system. For example, one disclosed embodiment provides a method of operating a display device having a see-through display screen. The method comprises displaying on the see-through display screen an image of an object, and while displaying the image of the object, displaying an image of a shadow cast by the object onto the background scene. The image of the shadow is displayed by acquiring an image of a background scene, determining a location of the shadow in the image of the background scene, rendering an enhanced image of the background scene by increasing a relative brightness in a region adjacent to the shadow compared to a brightness within the shadow, and displaying the enhanced image of the background scene.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, see-through display devices may allow the presentation of a displayed image over a real-world background, such that objects in the displayed images may appear to intermix with the real-world background. However, various aspects of such image presentation may make the displayed objects appear less lifelike. For example, shadows cast by real-world objects may be noticeably absent from objects displayed on the display device.

Generating images of shadows of virtual objects on a real-world background may pose various challenges. For example, where images are formed on the see-through display screen via projection or via an embedded emissive display technology (e.g. a transparent organic light emitting device), the displayed images add additional light to the scene as viewed by the user. In contrast, a shadow is created by subtracting light from a scene. Because such technologies do not allow light to be subtracted from the real-world background scene, displaying a shadow cast by a virtual object on the real-world background may pose difficulties.

Accordingly, the disclosed embodiments are directed to forming a shadow on a background scene in a see-through display device by increasing a relative brightness of non-shadow regions of the background scene as viewed by a user. Briefly, a reference image of a background scene is acquired, potentially globally reduced in brightness, and then re-rendered in such a manner as to form an enhanced image of the background scene in which non-shadow regions of the image of the background image have a greater relative brightness than shadow regions. The enhanced image of the background scene is then displayed to the user over the real-world background, along with the image of the virtual object from which the image of the shadow appears to originate. The display of the enhanced image of the background scene over the real-world background effectively adds light to the desired non-shadow portions of the real-world background scene as perceived by the viewer. This may create the effect of an image of a shadow cast on real-world objects in the background scene by the displayed virtual object.

In some embodiments, the increase in brightness of non-shadow regions of the enhanced image of the background scene compared to shadow regions of the enhanced image of the background scene may be global in extent, such that all non-shadow regions are increased in relative compared to shadow regions. In other embodiments, the increase in brightness may be local to areas adjacent to each shadow. Further, to mitigate the effect of the added light of the enhanced image of the background scene, in some embodiments, the see-through display screen may comprise optics, such as a neutral density filter, to reduce an amount of background light passing through the see-through screen.

Figure 1:
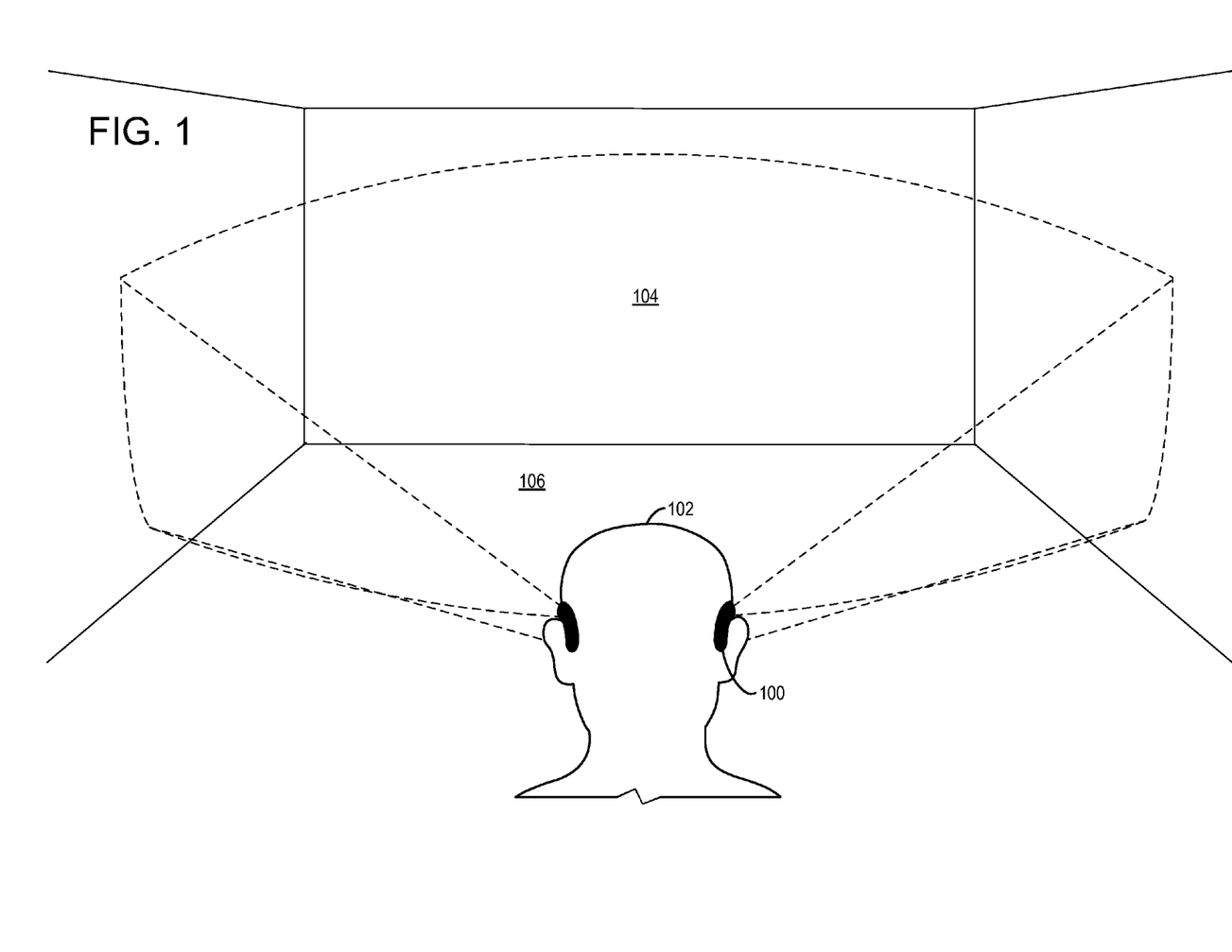
FIG. 1 shows an embodiment a see-through display system worn by a user in an example use environment.

FIG. 1 illustrates a use environment for an embodiment of a see-through display device 100 in the form of a head-mounted display system. A user 102 wearing the see-through display device 100 is located in a room, and is shown facing a wall 104. For the purpose of clarity, no physical objects are shown on the floor 106 or the wall 104 of the room within the field of view of the user. However, it will be understood that the see-through display device 100 may be used in virtually any environment, indoors or outdoors.

Figure 2:
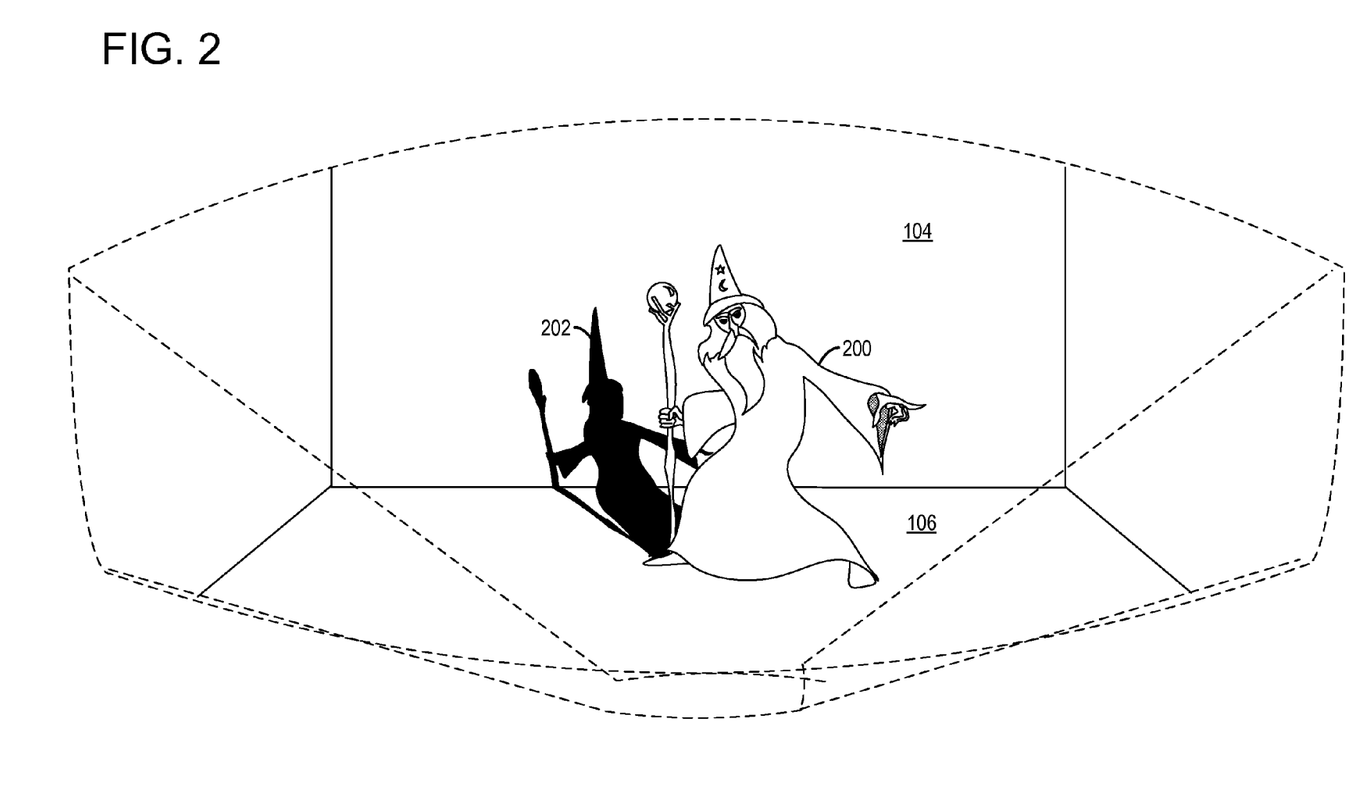
FIG. 2 shows a perspective of the user of FIG. 1 viewing embodiments of an object and an image of a shadow cast by the object over a background scene in the use environment of FIG. 1.

FIG. 2, shown from the perspective of user 102, illustrates an image of an object 200 in the form of a wizard displayed on the see-through display device 100, such that the object 200 appears to be located in the empty viewing environment of FIG. 1. Further, an image of a shadow 202 cast by the object 200 is shown as if cast on the real world background. In the depicted embodiment, the shadow follows the contour of the floor 106 and wall 104 in the same manner as would a real shadow. However, other embodiments may address changes or variations in background surface contour in other manners. It will be understood that the shadow may have any suitable size, shape, intensity and direction, depending upon a type and location of virtual light source(s) used to calculate the appearance of the shadow.

Figure 3:
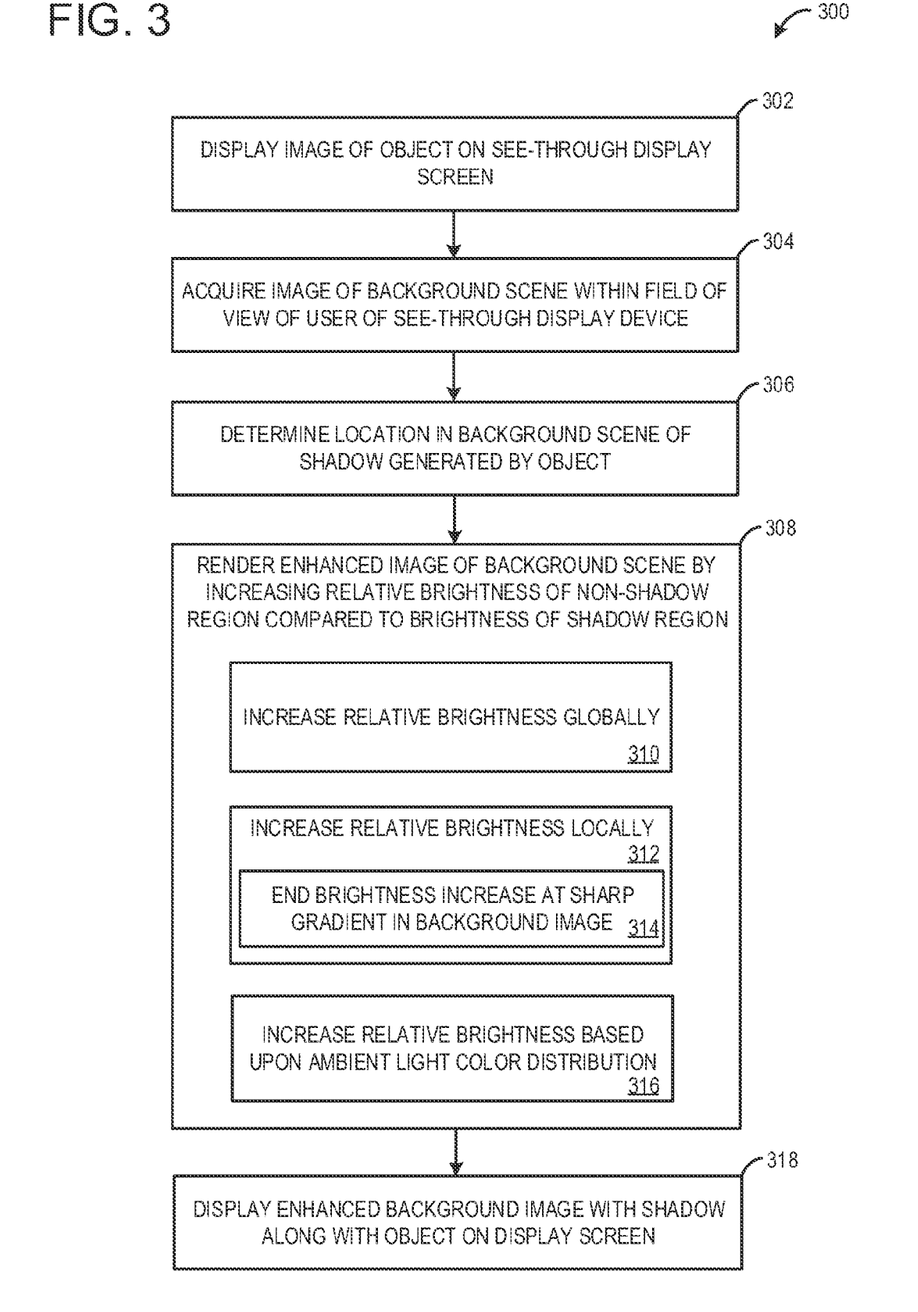
FIG. 3 shows a flow diagram depicting an embodiment of a method of operating a see-through display system.

As mentioned above, the image of the shadow 202 may be generated by re-rendering an image of the background scene over the actual background scene such that a relative brightness of non-shadow regions is increased compared to shadow regions of the image of the background scene. FIG. 3 shows a flow diagram depicting an example embodiment of a method 300 of displaying images of shadows in such a manner.

Method 300 comprises, at 302, displaying an image of an object on a see-through display screen, and at 304, acquiring a reference image of a background scene that is within a field of view of a user of the see-through display device. The reference image of the background scene may be processed in various manners to form an enhanced image of the background scene. For example, at 305, method 300 comprises determining a location in the background scene of a shadow generated by the displayed object. The location of the shadow may be determined in any suitable manner, including but not limited to via conventional real-time shadow generation techniques used in computer graphics. It will be understood that the location and appearance of the shadow may be dependent upon a type (e.g. parallel rays, diffuse light, etc.) and location (e.g. overhead, oblique, etc.) of a virtual light source or sources applied when determining the shadow location, as well as a particular shadow generation method employed.

As mentioned above, the location of the shadow in the background image may be dependent upon the structure of the use environment. For example, a shadow may change direction and/or shape depending upon the shape and orientation of surfaces in the use environment on which the shadow is to be cast. Therefore, in some embodiments, image processing may be performed to determine surface contour variations that may affect the appearance of a shadow, and such contour variations may then be taken into account when determining the shadow location.

After determining the shadow location, method 300 comprises, at 308, rendering an enhanced image of the background scene by increasing a relative brightness of the background scene in a non-shadow region adjacent to the shadow region compared to a brightness in the shadow region. This may involve various processes. For example, in some embodiments, the entire image of the background scene first may be darkened to form a base image, and then desired non-shadow regions may be selectively brightened relative to the shadow regions. Alternatively and/or additionally, the desired shadow regions may be selectively darkened relative to the non-shadow regions. It will be understood that such pre-darkening of the original image of the background scene may be omitted where suitable, such as in low light use environments. It further will be understood that an amount by which the original image of the background scene is darkened may be fixed or variable, and may be selected or varied based upon such factors as an amount of background light that is removed by a neutral density filter, an intensity of the background light in an actual or expected use environment, etc.

In some embodiments, as indicated at 310, the relative brightness of the non-shadow region of the image may be brightened globally, such that a relative brightness of all non-shadow regions of the enhanced image of the background scene are increased relative to all shadow regions. In other embodiments, as indicated at 312, the relative brightness of non-shadow regions may be increased locally. In such embodiments, a relative brightness differential may have a maximum located at or near the shadow/non-shadow border, and decreases from the maximum as a function of distance from the shadow region. The use of a sufficiently gradual brightness gradient (as a non-limiting example, over an angular view of 20 degrees) may help to make the bright spot around the shadow less noticeable due to the lower sensitivity of the human visual system to gradual light change. It will be understood that such brightness gradients may be more noticeable where they cross an edge, for example, between different colors, textures, etc. in the background image due to the sensitivity of the human eye to changes in brightness over narrow ranges. Therefore, as indicated at 314, the increase in relative brightness of a non-shadow region adjacent to a shadow region may terminate at a sharp gradient (e.g. that exceeds a preselected threshold gradient) in the background image.

Where a relative brightness of the non-shadow regions is increased globally, the addition of the enhanced image of the background scene over the real-world background may cause a noticeable brightening in some circumstances. To avoid unwanted brightening, the aforementioned neutral density filter and/or other suitable optics may be used to reduce the total brightness of the image that reaches the user's eyes by blocking some background light. In embodiments in which the relative brightness is increased locally, a neutral density filter may be omitted, as the brightened areas may not noticeably affect the overall brightness of the image as viewed by the user.

The brightness of the non-shadow region may be increased any suitable relative amount compared to the brightness of the shadow region. It will be noted that real-world shadows are generally not totally black, but instead may have a relatively small decrease in intensity compared to adjacent non-shadow areas due to bounced light and other ambient light sources. Therefore, in some embodiments, the relative brightness differential between the shadow and non-shadow regions may be relatively subtle. Examples of suitable differences in brightness include, but are not limited to, differences of 2-3 stops.

Ambient background light may have a different color distribution depending upon the source of ambient light in a viewing environment. For example, interior ambient light may have a spectrum with peaks corresponding to the peak wavelengths of the light sources used in that interior environment. Likewise, different exterior locations may have different ambient light color distributions due to environmental differences. For example, ambient light in an arid environment on a sunny day may have a stronger blue component than sunlight due to the wavelength distributions of bounced light in such environments.

Therefore, to help make the increase in the relative brightness intensity appear more natural, method 300 may comprise, at 316, performing a color analysis to determine a color distribution in the ambient light (e.g. intensity v. wavelength), and increasing the relative brightness based upon the color intensity distribution. For example, if a color analysis shows that the ambient light has a relatively even distribution of color intensities, then non-shadow regions may be increased in intensity by adding white light to the non-shadow regions. Likewise, if a color analysis shows that the ambient light has a predominantly blue distribution, then similarly blue light may be added to the non-shadow regions of the enhanced image of the background scene.

Continuing with FIG. 3, after forming the enhanced image of the background scene, method 300 comprises, at 318, displaying the enhanced image of the background scene along with the image of the object on the see-through display. In this manner, the shadow in the enhanced image of the background scene may appear to be cast by the displayed object onto the real-world background. This may help to provide a perspective of depth for the object, which may help to convey a sense that the displayed object actually exists in the use environment.

Depending upon a processing speed of the see-through display device and a rate at which a user is changing perspective in the environment, the perspective of the user may change quickly enough that the enhanced image of the background scene is not sufficiently aligned to a current perceived background. Therefore, in some embodiments, the see-through display device may be configured to track the motions of the user, and in response, to correct for any misalignment between the enhanced image of the background scene and the currently perceived real-world background. Such correction may be performed, for example, by positionally offsetting the enhanced image of the background scene based upon tracked user motions during the period between acquiring the original image and displaying the enhanced image of the background scene. Such tracking may be performed in any suitable manner, including but not limited to via motion sensors disposed on the see-through display device.

Figure 4:
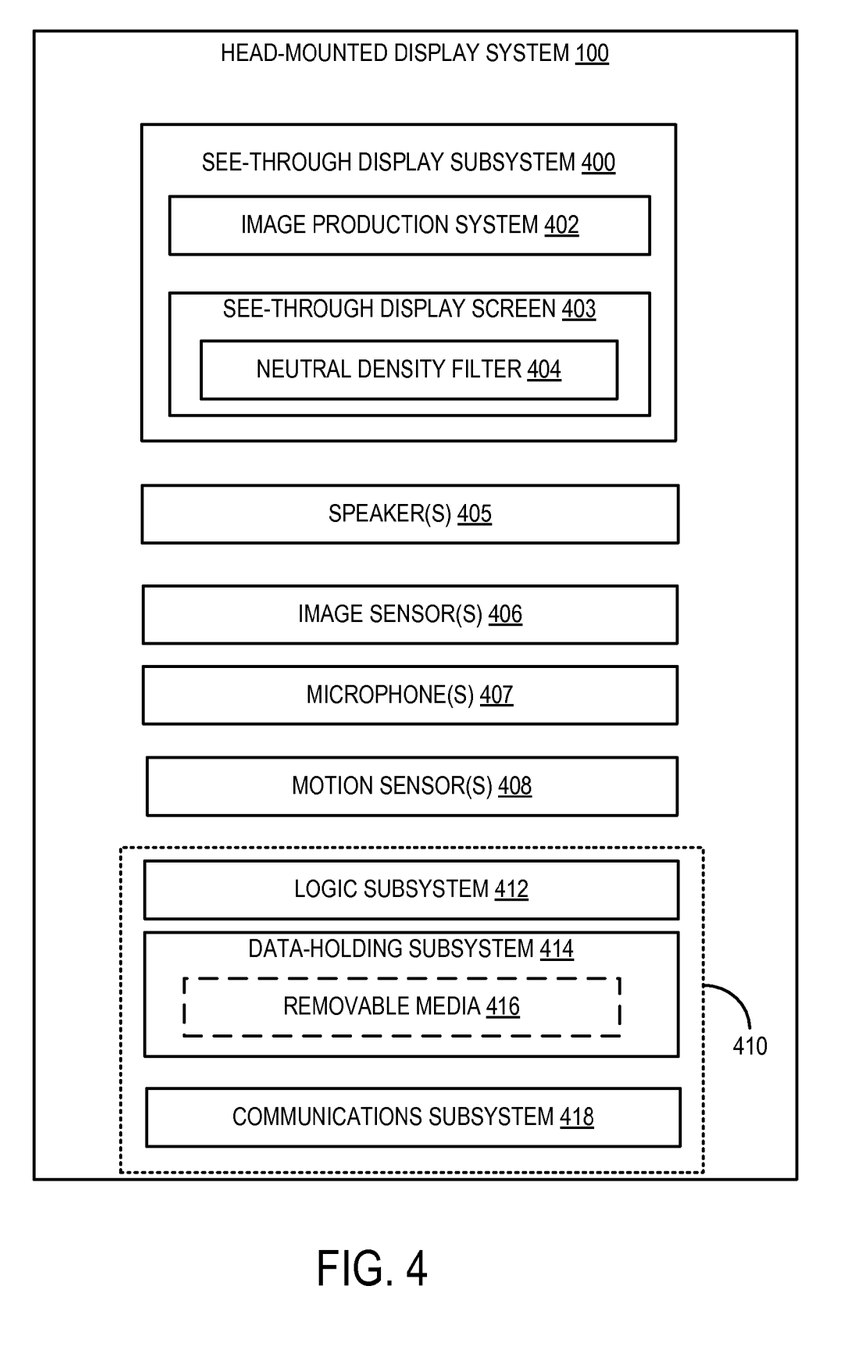
FIG. 4 shows a block diagram of an embodiment of a see-through display system.
Figure 5:
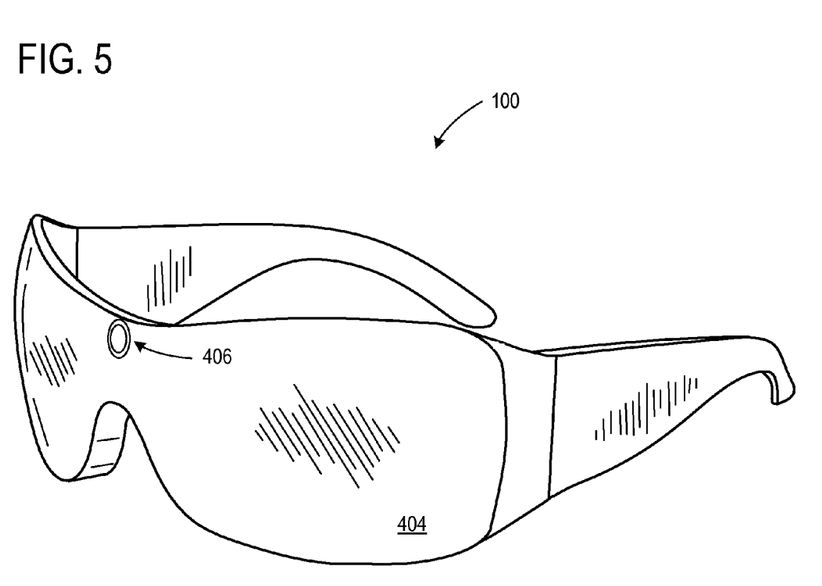
FIG. 5 shows a perspective view of the embodiment of FIG. 1.

The above-described embodiments of methods of displaying shadows on a see-through display may be used with any suitable see-through display device, including but not limited to the head-mounted display system of FIG. 1. FIG. 4 shows a block diagram of an embodiment of the see-through display device 100, and FIG. 5 shows an example physical embodiment of the see-through display device 100. The see-through display device 100 may comprise various sensors and output devices. For example, see-through display device 100 may comprise a see-through display subsystem 400 having an image production system 402 configured to produce images and display the images on a see-through display screen 403, for example, in the form of lenses. The image production system 402 may be configured to project images onto the see-through display screen 403, to display images via image-producing elements incorporated into the see-through display screen 403 (e.g. a transparent OLED display), or in any other suitable manner. The see-through display screen 403 may comprise a neutral density filter 404 and/or other optics to reduce an amount of background light that reaches a viewer. Audio may be presented via one or more speakers 405 on the see-through display device 100.

The see-through display device 100 may further comprise one or more image sensors 406. The image sensor(s) 406 may include one or more outwardly-facing image sensors configured to acquire an image of a background scene for processing into an enhanced image of the background scene. Likewise, the image sensor(s) 406 may include eye tracking image sensors configured to acquire image data to allow a viewer's eyeballs to be tracked for various purposes, such as determining where to locate objects in a displayed image, detecting user inputs made via eye gestures, etc. The see-through display device 100 may further comprise one or more microphones 407 to allow the use of voice commands as user inputs.

The see-through display device 100 may further comprise one or more motion sensors 408 to detect movements of a viewer's head when the viewer is wearing see-through display device 100. This may allow, for example, an enhanced image of the background scene to be aligned with a current background view. Likewise, the motion sensors 408 also may be employed as user input devices, such that a user may interact with the see-through display device 100 via gestures of the neck and head, or even of the body. The motion sensors 408 may be configured to detect any suitable movements of the user's head, including translational and/or tilt movements. It will be understood that the sensors illustrated in FIG. 4 are shown for the purpose of example and are not intended to be limiting in any manner, as any other suitable sensors and/or combination of sensors may be utilized.

The head-mounted display system 110 may have any suitable physical form. For example, in some embodiments, the head-mounted display system 110 may take the form of a pair of eyeglasses as shown in FIG. 5, wherein the lenses may be clear, or darkened via a neutral density filter or other suitable optics. In FIG. 5, an outwardly-facing image sensor 406 is shown located at a top-center location on the frame of the eyeglasses, but it will be understood that the image sensor 406 may have any other suitable location. Further, it will be understood that, in other embodiments, the head-mounted display system 110 may take any other suitable form, such as a helmet, goggles, etc. in which a see-through display system is supported in front of a viewer's eye or eyes.

Returning to FIG. 4, the see-through display device 100 further comprises a controller 410 having a logic subsystem 412 and a data-holding subsystem 414 in communication with the various other components of see-through display device 100. The data-holding subsystem 414 comprises instructions stored thereon that are executable by the logic subsystem 412, for example, to display images of objects and shadows formed by the object on the see-through display screen 403, as described above.

It will be understood that the controller 410 is shown in simplified form. It also will be understood that the see-through display device 100 may utilize any suitable computer architecture without departing from the scope of this disclosure.

The logic subsystem 412 may include one or more physical devices configured to execute one or more instructions. For example, the logic subsystem 412 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 412 may include one or more processors that are configured to execute software instructions. Additionally or alternatively, the logic subsystem 412 may include one or more hardware or firmware logic machines configured to execute hardware or firmware instructions. Processors of the logic subsystem 412 may be single core or multicore, and the programs executed thereon may be configured for parallel or distributed processing. The logic subsystem 412 may optionally include individual components that are distributed throughout two or more devices, which may be remotely located and/or configured for coordinated processing. One or more aspects of the logic subsystem 412 may be virtualized and executed by remotely accessible networked computing devices configured in a cloud computing configuration.

The data-holding subsystem 414 may include one or more physical, non-transitory, devices configured to hold data and/or instructions executable by the logic subsystem to implement the herein described methods and processes. When such methods and processes are implemented, the state of the data-holding subsystem 414 may be transformed (e.g., to hold different data).

The data-holding subsystem 414 may include removable media and/or built-in devices. The data-holding subsystem 414 may include memory and/or devices with one or more of the following characteristics: volatile, nonvolatile, dynamic, static, read/write, read-only, random access, sequential access, location addressable, file addressable, and content addressable. In some embodiments, the logic subsystem 412 and the data-holding subsystem 414 may be integrated into one or more common devices, such as an application specific integrated circuit or a system on a chip.

The data-holding subsystem further may comprise removable computer-readable storage media 416, which may be used to store and/or transfer data and/or instructions executable to implement the herein described methods and processes. Removable computer-readable storage media 416 may represent any suitable type of storage media, including but not limited to DVDs, CDs, HD-DVDs, Blu-Ray Discs, EEPROMs, tape drives, and/or floppy disks, among others.

The controller 410 further may comprise a communication subsystem 418 configured to communicatively couple the see-through display device 100 with one or more other computing devices. The communication subsystem 418 may include wired and/or wireless communication devices compatible with one or more different communication protocols. As nonlimiting examples, the communication subsystem 418 may be configured for communication via a wireless telephone network, a wireless local area network, a wired local area network, a wireless wide area network, a wired wide area network, etc. In some embodiments, the communication subsystem 418 may allow the see-through display device 100 to send and/or receive data, such as video data, game data, image data, etc. to and/or from other devices via a network such as the Internet.

It is to be appreciated that the data-holding subsystem 414 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of operating an optical see-through display device having a see-through display screen and a camera, the method comprising:
   displaying on the see-through display screen an image of an object; and
   while displaying the image of the object, displaying an image of a shadow cast by the object onto a real-world background scene by
      acquiring via the camera an image of the real-world background scene viewable through the see-through display screen,
      determining a location of the shadow in the image of the real-world background scene,
      rendering the image of the real-world background scene to form an enhanced image of the real-world background scene by increasing a brightness of the real-world background scene in the enhanced image of the real-world background scene in a region adjacent to the shadow compared to a brightness within the shadow, and
      displaying via the see-through display screen the enhanced image of the real-world background scene over and aligned with the real-world background scene.

2. The method of claim 1, further comprising reducing an amount of natural light passing through the see-through display screen via a neutral density filter.

3. The method of claim 1, wherein rendering the enhanced image of the real-world background scene comprises not increasing the brightness within the shadow.

4. The method of claim 1, wherein rendering the enhanced image of the real-world background scene comprises darkening the image of the real-world background scene globally.

5. The method of claim 1, wherein increasing the brightness in the region adjacent to the shadow comprises increasing a brightness of non-shadow regions globally.

6. The method of claim 1, wherein increasing the brightness in the region adjacent to the shadow comprises increasing the brightness locally such that a brightness differential decreases as a function of distance from the shadow.

7. The method of claim 6, further comprising detecting an edge in the image of the real-world background scene that exceeds a preselected threshold gradient, and terminating the increase in the brightness at the edge.

8. The method of claim 1, further comprising determining a color distribution of ambient light, and increasing the brightness by increasing the brightness based upon the color distribution of the ambient light.

9. The method of claim 1, wherein displaying the image of the object and the image of the shadow cast by the object comprises displaying the image of the object and the image of the shadow cast by the object on a head-mounted display system.

10. An optical see-through head-mounted display system, comprising:
    a see-through display screen;
    an image production system configured to display an image on the see-through display screen;
    an image sensor configured to acquire an image of a real-world background scene viewable through the see-through display screen;
    a logic subsystem; and
    a data-holding subsystem comprising instructions executable by the logic subsystem to
       display an image of an object on the see-through display screen; and
       while displaying the image of the object, display an image of a shadow cast by the object onto the real-world background scene by
          acquiring via the image sensor the image of the real-world background scene viewable through the see-through display screen,
          determining a location of the shadow in the image of the real-world background scene,
          rendering the image of the real-world background scene to form an enhanced image of the real-world background scene in which a brightness of the real-world background scene in the enhanced image of the real-world background scene in a region adjacent to the shadow is increased compared to a brightness within the shadow, and displaying the enhanced image of the real-world background scene on the see-through display screen over and aligned with the real-world background scene.

11. The head-mounted display system of claim 10, wherein the see-through display screen further comprises a neutral density filter.

12. The head-mounted display system of claim 10, wherein the instructions are executable to render the enhanced image of the real-world background scene by increasing the brightness in the region adjacent to the shadow while not increasing the brightness within the shadow.

13. The head-mounted display system of claim 10, wherein the instructions are executable to increase the brightness in the region adjacent to the shadow by increasing a brightness of non-shadow regions globally.

14. The head-mounted display system of claim 10, wherein the instructions are executable to increase the brightness in the region adjacent to the shadow by increasing the brightness locally such that a brightness differential decreases as a function of distance from the shadow.

15. The head-mounted display system of claim 14, wherein the instructions are executable to detect an edge in the image of the real-world background scene that exceeds a preselected threshold gradient, and terminate the increase in the brightness at the edge.

16. The head-mounted display system of claim 10, wherein the instructions are further executable to determine a color distribution of ambient light, and to increase the brightness by increasing the brightness based upon the color distribution of the ambient light.

17. On an optical see-through head-mounted display system comprising a see-through display screen, a camera, and a neutral density filter, a method of displaying an image of an object and an image of a shadow of the object over a real-world background scene viewable through the see-through display screen, the method comprising:

displaying on the see-through display screen the image of the object;

reducing an amount of ambient light passing through the see-through display screen via the neutral density filter; and while displaying the image of the object, displaying an image of a shadow of the object onto the real-world background scene by acquiring via the camera an image of the real-world background scene viewable through the see-through display screen, determining a location of the shadow in the image of the real-world background scene, rendering the acquired image of the real-world background scene to form an enhanced image of the real-world background scene by increasing a brightness of the real-world background scene in the enhanced image of the real-world background scene in non-shadow regions of the image and not increasing a brightness within the shadow, and displaying the enhanced image of the real-world background scene on the see-through display screen over and aligned with the real-world background scene such that light is added to the non-shadow regions.

18. The method of claim 17, wherein rendering the enhanced image of the real-world background scene comprises darkening the image of the real-world background scene globally before brightening the region adjacent to the shadow.

19. The method of claim 17, further comprising determining a color distribution of ambient light, and increasing the brightness by increasing the brightness based upon the color distribution of the ambient light.

* * * * *